United States Patent [19]

Hardingham

[11] Patent Number: 4,579,160
[45] Date of Patent: Apr. 1, 1986

[54] NON-COLLAPSING PNEUMATIC SAFETY TIRE

[75] Inventor: Derek D. Hardingham, Arlington, Va.

[73] Assignee: Arthur H. Berndtson, Washington, D.C. ; a part interest

[21] Appl. No.: 563,710

[22] Filed: Dec. 21, 1983

[51] Int. Cl.⁴ .............................................. B60C 17/00
[52] U.S. Cl. .................................... 152/158; 152/156; 152/450
[58] Field of Search ............... 152/151, 152, 155, 156, 152/157, 158, 330 RF

[56] References Cited

U.S. PATENT DOCUMENTS

| 976,710 | 11/1910 | Treier | 152/155 |
| 1,349,339 | 8/1920 | Horne | 152/155 |
| 2,941,565 | 6/1960 | Rusch et al. | 152/158 |

FOREIGN PATENT DOCUMENTS

| 650322 | 10/1962 | Canada | 156/156 |
| 2309814 | 9/1974 | Fed. Rep. of Germany | 152/330 RF |
| 285659 | 9/1952 | Sweden | 152/158 |

Primary Examiner—Lois E. Boland
Attorney, Agent, or Firm—Eric P. Schellin

[57] ABSTRACT

A pneumatic tire, which has a plurality of comprssion springs radially disposed inside a conventional tire casing, located in such a manner, that if the tire is punctured and the air is lost, the radius of said tire will remain substantially constant, which will allow the vehicle or aircraft involved to retain its stability, and thus prevent damage to property and the loss of human life.

4 Claims, 5 Drawing Figures

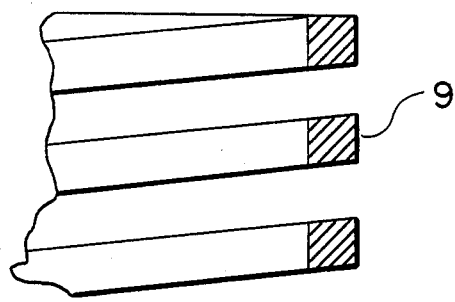
FIG. 5
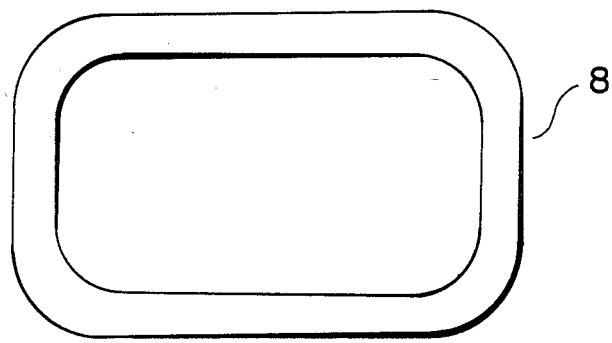
FIG. 3
FIG. 4
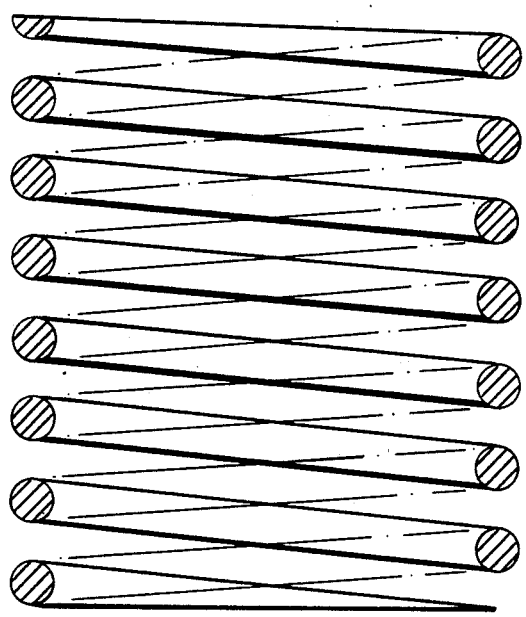

NON-COLLAPSING PNEUMATIC SAFETY TIRE

BACKGROUND OF THE INVENTION

1. Field of the Invention

Pneumatic Tires.

2. Description of the Prior Art

In the field of pneumatic tires, there are many forms of tire construction which provide the necessary cushioning effect for many types of land vehicles and aircraft.

One of the operational disadvantages associated with conventional forms of tire construction, is that, although evolutionary improvements have increased durability and, to some extent, resistance to puncturing, when a tire is punctured, it can no longer retain the air contained within. This type of situation can very often result in land vehicles and aircraft suffering damage, together with the loss of human life.

The present invention overcomes the difficulties and operational disadvantages of previously available pneumatic tires, since the internal means now provided, prevents the tire from deflating in the normal manner.

SUMMARY OF THE INVENTION

A conventional tire casing containing a plurality of compression springs which are radially disposed, and arranged in such a manner, that if the tire is punctured, the pre-loaded springs will prevent the collapse of the tire casing, and thereby permit the vehicle or aircraft to proceed safely under control, until it is convenient to stop.

A major object of the present invention, is to provide an internal mechanical means capable of improving pneumatic tires, so that, in the event of a rapid puncture, the tire will not collapse; thus reducing the possibility of accident; injury and loss of life.

Another major object of the invention is to provide a pneumatic tire suitable for naval aircraft in particular, since when an aircraft lands upon the deck of an aircraft carrier with punctured tires, it can be extremely hazardous, and often results in the aircraft being severely damaged; together with injury or loss of life to the aircrew. Other aircraft parked in the vicinity of a deck crash, together with aircrew and a variety of deck equipment can also be involved. The close proximity of fuel and weapons can also accentuate this type of problem to the point, where the ship itself can be severely damaged.

A further object of the invention is to provide a safer tire for automobiles, and all other forms of land vehicles where pneumatic tires are normally used, in order to reduce the risk of accident; personal injury, and loss of life.

A still further object of the invention is to improve the performance and safety of pneumatic tires, without any alteration to current tire molding procedures, so that the additional mechanical means shown in this invention can be produced separately, and then be added to the tire casing either at the time of manufacture, or to existing stocks in warehouses; on board ships, etc., etc.

BRIEF DESCRIPTION OF THE DRAWINGS

FIG. 3 is a plan view of a rectangular section coil spring for use in wide tires.

FIG. 4 is a sectional view of a rectangular spring where the steel material is of a circular cross section.

FIG. 5 is a cross sectional view of a rectangular spring in elevation, where the steel material is of a rectangular cross section.

DESCRIPTION OF THE PREFERRED EMBODIMENT

Figure 1:
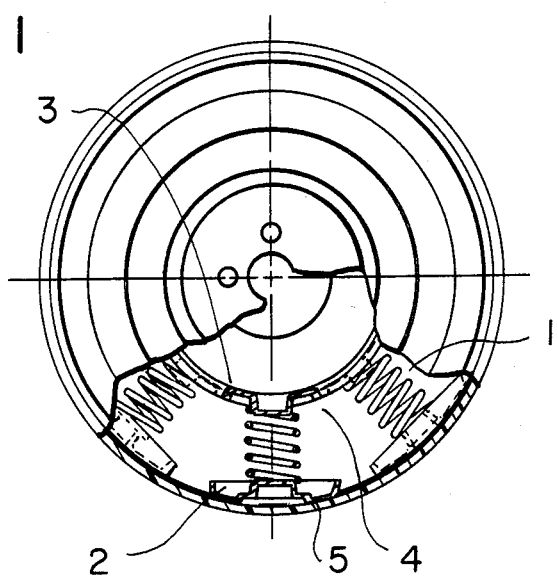
FIG. 1 is a part cross section of a tire showing a plurality of compression springs radially disposed inside a conventional tire casing.
Figure 2:
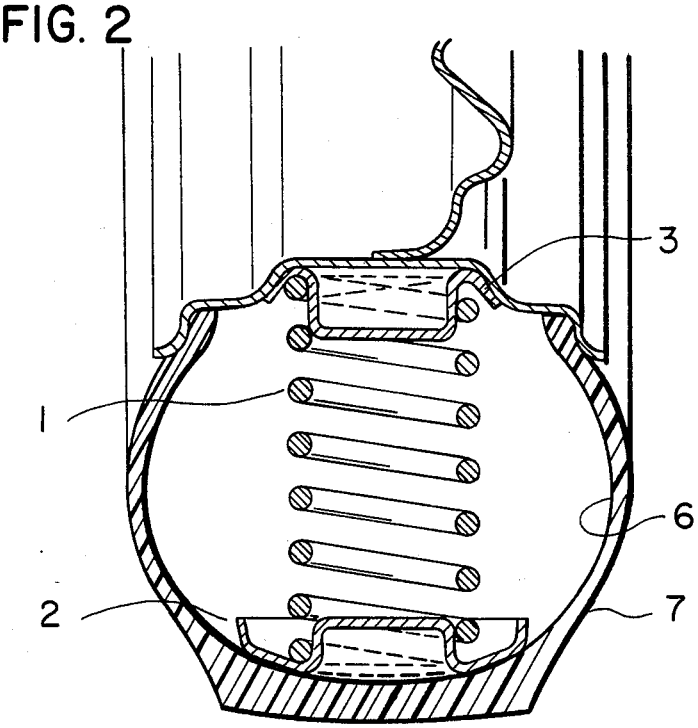
FIG. 2 is a part cross section showing the spring retaining plates in position, which allows the individual springs to deflect longitudinally without circumferential movement.

The compression spring inserts described above, consist of a metallic compression spring (1) an outer retaining and locating plate (2) an inner retaining and locating plate (3).

Each individual spring assembly is located at the inner end by plate (3) which prevents circumferential movement due to plate flangers (4) being in firm radial contact.

Each individual spring assembly is located at the outer end by plate (5) which, when the spring is in compression, allows the longitudinal force thus generated to be distributed over a large area of the internal surface (6) of the tire casing (7).

I claim:

1. A tire assembly comprising a pneumatic tire, a plurality of springs radially disposed in the tire for supporting the tire from collapse upon puncture of the tire without appreciable deformation, each spring is provided with an inner locating and retaining plate and an outer locating and retaining plate, each inner plate is provided with flanges that provide firm radial contact with adjacent flanges of adjacent inner plates to prevent circumferential movement of the springs.

2. A tire assembly as defined by claim 1 wherein the outer retaining and locating plate is larger than the spring so as to distribute the compression force over a large area of the tire.

3. A tire and wheel assembly comprising a pneumatic tire, a wheel having a rim on which the pneumatic tire is mounted, a plurality of springs radially disposed in the tire for supporting the tire from collapse upon puncture of the tire without appreciable deformation, each spring is provided with an inner locating and retaining plate and an outer locating and retaining plate, each inner plate is in contact with the rim of the wheel and is provided with flanges that provide firm radial contact with adjacent flanges of adjacent inner plates to prevent circumferential movement of the springs.

4. A tire and wheel assembly as defined by claim 3 wherein the outer retaining and locating plate is larger than the spring so as to distribute the compression force over a large area of the tire.

* * * * *